H. N. PARSONS.
ANTIFRICTION BEARING.
APPLICATION FILED NOV. 24, 1919.
1,420,339.
Patented June 20, 1922.
2 SHEETS—SHEET 1.
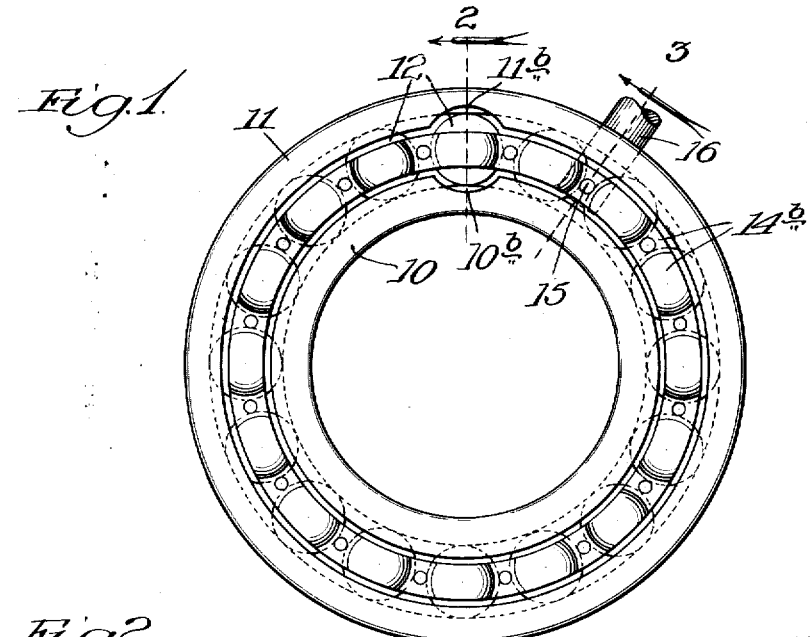
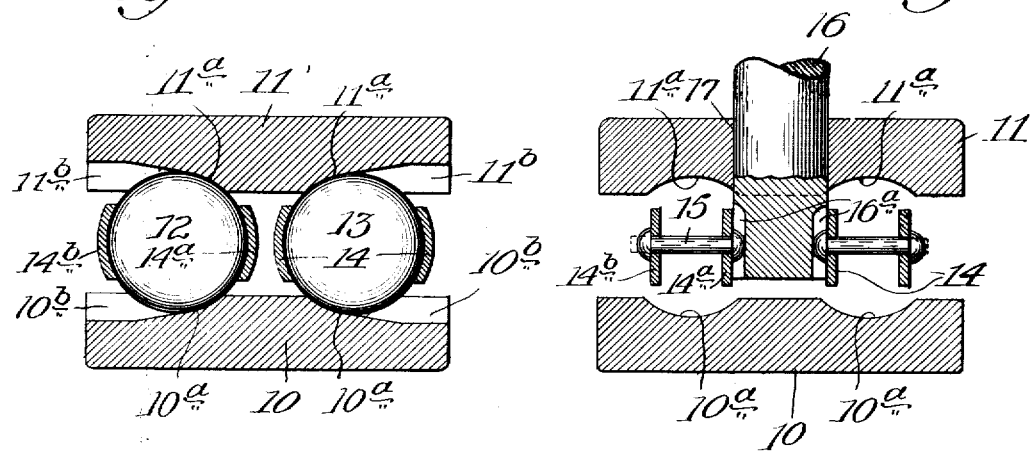
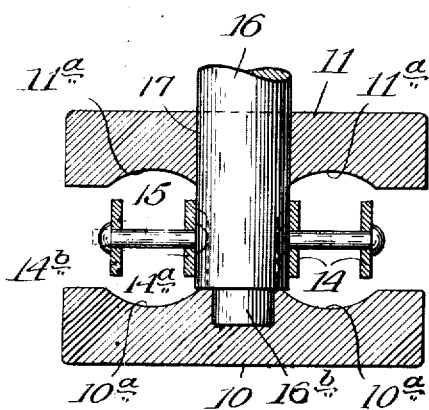
Inventor:
Harry N. Parsons, H. N. PARSONS.
ANTIFRICTION BEARING.
APPLICATION FILED NOV. 24, 1919.
1,420,339.
Patented June 20, 1922.
2 SHEETS—SHEET 2.
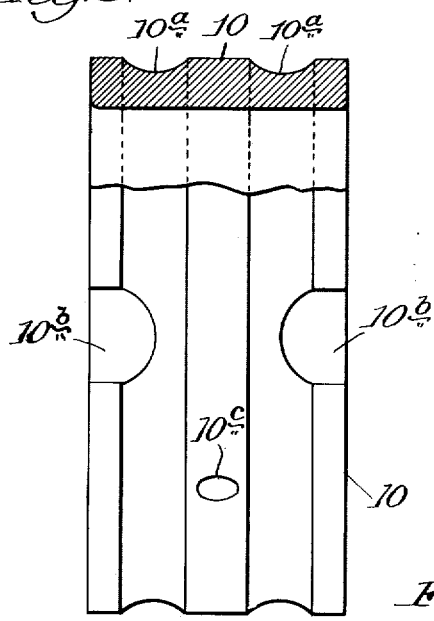
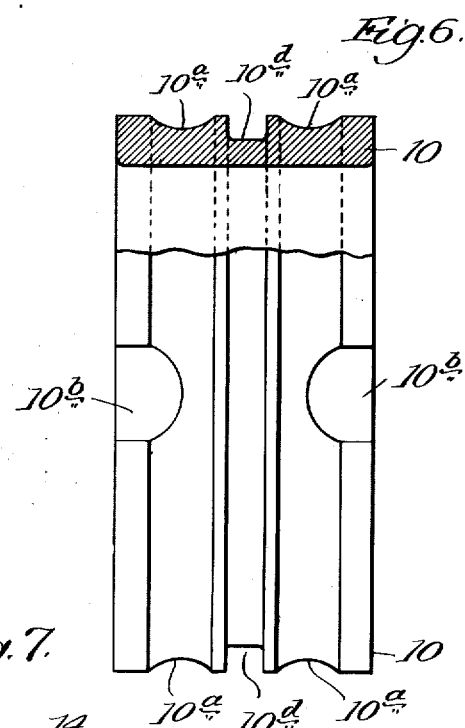
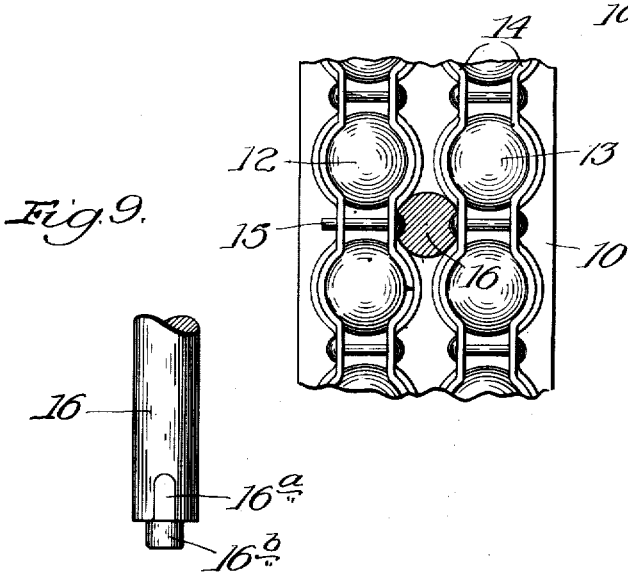
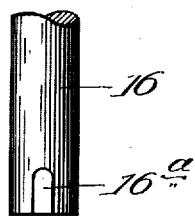
Inventor:
Harry N. Parsons,
By Dyrenforth, Lee, Chritton & Wiles,
Attys.

UNITED STATES PATENT OFFICE.

HARRY N. PARSONS, OF CHICAGO, ILLINOIS, ASSIGNOR TO U. S. BALL BEARING MANUFACTURING COMPANY, OF CHICAGO, ILLINOIS, A CORPORATION OF ILLINOIS.

ANTIFRICTION BEARING.

1,420,339.    Specification of Letters Patent.    Patented June 20, 1922.

Application filed November 24, 1919. Serial No. 340,168.

*To all whom it may concern:*

Be it known that I, HARRY N. PARSONS, a citizen of the United States, residing at Chicago, in the county of Cook and State of Illinois, have invented a new and useful Improvement in Antifriction Bearings, of which the following is a specification.

My invention relates to antifriction bearings and is particularly adapted for radial bearings having a plurality of rows of antifriction members. It is fully described in the following specification and shown in the accompanying drawings, in which—

Figure 1 is a side elevation of a bearing embodying my invention;

Fig. 2 is a transverse section on the line 2—2 of Fig. 1;

Fig. 3 is a transverse section on the line 3—3 of Fig. 1;

Fig. 4 is a transverse section similar to Fig. 3, but showing an inner race member similar to Fig. 5 or Fig. 6;

Figs. 5 and 6 are side elevations partially in sections of modified forms of inner race members;

Fig. 7 is a partial side elevation showing two rows of balls with spacers lying in parallel planes;

Fig. 8 is a detail of the end of a riveting tool shown in Fig. 3, and

Fig. 9 is a similar view of the riveting tool shown in Fig. 4.

I have illustrated as an embodiment of my invention a two row combined radial and thrust ball bearing having inner and outer race members 10 and 11 which have parallel ball races $10^a$ and $11^a$ respectively so placed that they face each other and are adapted to receive sets of balls 12 and 13. Each of these sets of balls is separated and held in spaced relation by means of formed separators 14 which have pockets or cups therein to receive the balls, and which are held by means of rivets 15.

The inner and outer space members are provided with side channels $10^b$ and $11^b$ respectively through which the balls are inserted. The balls forming the first ball set are dropped one at a time through these side channels while they are in registration as shown in Figs. 1 and 2. When the desired number of balls have been placed therein they are separated by means of the separator elements 14 and the rivets 15 inserted therein and the ends thereof riveted over thereby completing the first ball set.

It will be understood that as long as there is only one set of balls in place it will be very easy to place these over any convenient form of anvil whereby the rivets will be sufficiently backed up while being riveted. With the addition of the second row of balls, however, in close proximity to the first it has heretofore been very difficult to find any means for inserting an anvil or "dolly."

In my invention, however, an "anvil" or "dolly" 16 may be inserted through a hole 17 in either the inner or outer race member. The end of this anvil as shown in Figs. 3 and 7 is adapted to be inserted between the two ball sets and to receive a rivet in a groove $16^a$ in each side thereof.

It will readily be understood from the foregoing that on making up the second ball set the inner separator $14^a$ is first inserted and then the balls 12 dropped one at a time through the channels $10^b$, at the same time turning the separator $14^a$ so as to present the cups one at a time to be filled. This separator member $14^a$ preferably is inserted with the set of rivets 15 riveted or otherwise secured thereto. With this set of balls now in place the second separator member $14^b$ is now placed over the end of the rivets 15 and the anvil 16 inserted through the hole 17 in the outer race member. This anvil as shown in Figs. 3 and 7 falls immediately behind one of the rivets 15 and forms a solid backing for that rivet so that its outer end can now be riveted over. The bearing is now turned so that the rivets are successfully brought in front of the anvil which is inserted in each rivet and each rivet is headed over.

In some cases it may be desirable to support both ends of the anvil 16. In Fig. 5 I have illustrated a modification in which the inner race member has a hole $10^c$ therein adapted to receive the end $16^a$ of the anvil 16. In Fig. 6 I have illustrated another and preferred form in which the inner race member is provided with an annular groove $10^d$ which is likewise adapted to receive the reduced end $16^a$ of the anvil.

While I have shown and described but a few embodiments of my invention it is to be understood that it is capable of many more modifications. Changes therefore in the construction and arrangement may be made which do not depart from the scope of the appended claims in which it is my intention to claim all novelty inherent in my invention as broadly as possible in view of the prior art.

What I claim as new and desire to secure by Letters Patent is:

1. In a ball bearing, a pair of adjacent raceways, a pair of adjacent rows of balls therein, a riveted separator for each row of balls and an opening between adjacent raceways adapted to receive a tool for holding a separator while being riveted.

2. In a radial bearing, an inner and an outer race member, each having a plurality of raceways therein, a set of antifriction members in each of said raceways, a separator for each of said sets, and an opening in one of said members between each of said adjacent raceways adapted to receive a tool for fastening said separator.

3. In a radial bearing, an inner and an outer race member each having a plurality of raceways therein, a set of antifriction members in said raceways, a separator for each of said sets, said separator comprising elements united by rivets, and an opening in one of said race-members adapted to receive a riveting tool.

4. In a radial bearing, an inner and an outer race member each having a plurality of raceways therein, a set of antifriction members in said raceways, a separator for each of said sets, said separator comprising elements united by rivets, and an opening in one of said race-members adapted to permit a tool to be inserted between said separators to hold said rivets while being riveted.

5. In a ball bearing, a pair of adjacent raceways, a pair of adjacent rows of balls therein, a riveted separator for each row of balls and an opening in one of said raceways to receive a tool for riveting one of said separators and means on the other raceway for supporting the end of said tool.

6. In a radial bearing, an inner and an outer race member each having a plurality of raceways therein, a set of antifriction members in each of said raceways, a separator for each of said sets, said separator comprising elements united by rivets, and an opening in the outer race member adapted to permit a tool to be inserted between said separators to hold said rivets while being riveted.

7. In a radial bearing, an inner and an outer race member each having a plurality of raceways therein, a set of anti-friction members in said raceways, a separator for each of said sets, said separator comprising elements united by rivets, an opening in the outer race member adapted to permit a tool to be inserted between said separators to hold said rivets while being riveted, said opening being adapted to closely fit said riveting tool.

8. In a ball bearing, a pair of adjacent raceways, a pair of adjacent rows of balls therein, a riveted separator for each row of balls and an opening between adjacent raceways adapted to receive a tool for holding a separator while being riveted said separators being free to turn independently of each other.

9. In a ball bearing, outer and inner race-members, each having a pair of raceways, a pair of rows of balls in said raceways, a riveted separator for each row of balls, said race-members and said separators being adapted to permit of the riveting of said separators after the balls are placed in the raceways.

10. In a radial bearing, an inner and an outer race-member, each having a plurality of raceways, a set of antifriction members in each of said raceways and a riveted separator for each of said sets, each separator comprising a plurality of parts riveted together, said race-members and said separators being adapted to permit of the riveting of said separators after the balls are placed in the raceways.

HARRY N. PARSONS.

DISCLAIMER.

1,420,339.—*Harry N. Parsons*, Chicago, Ill. ANTIFRICTION BEARING. Patent dated June 20, 1922. Disclaimer filed March 12, 1923, by the assignee *U. S. Ball Bearing Manufacturing Co.*

Hereby enters this disclaimer—

To that part of the claim in said specification which is in the following words, to wit:

"2. In a radial bearing, an inner and an outer race member, each having a plurality of raceways therein, a set of anti-friction members in each of said raceways, a separator for each of said sets, and an opening in one of said members between each of said adjacent raceways adapted to receive a tool for fastening said separator."

[*Official Gazette March 27, 1923.*]